April 22, 1952

T. NIETER 2,593,479

ELECTRICAL APPARATUS USING METALIZED CIRCUITS AND COMPONENTS THEREFOR

Filed July 7, 1948

INVENTOR.
Temple Nieter
BY
Foorman L. Mueller
Atty.

Patented Apr. 22, 1952

2,593,479

UNITED STATES PATENT OFFICE 2,593,479

ELECTRICAL APPARATUS USING METALIZED CIRCUITS AND COMPONENTS THEREFOR

Temple Nieter, Evanston, Ill., assignor to Motorola, Inc., Chicago, Ill., a corporation of Illinois Application July 7, 1948, Serial No. 37,424

5 Claims. (Cl. 173—328)

This invention relates to electrical apparatus of the type in which conductors are formed on insulating surfaces, and it is concerned generally with expediting the manufacture of such apparatus, reducing the cost thereof and making the product superior to competitive articles that are presently available.

Multiple connection devices utilizing conductors formed on insulating surfaces have been proposed as a means of reducing the time and skill otherwise required to assemble complex electrical equipment, such as radio sets. Electrical conductors may be produced on an insulating sheet by a number of methods such as printing, spraying, die-casting, chemical or electrolytic deposition, painting or sputtering. Such connection devices are commonly referred to as "printed circuits," although I prefer to use the term "metalized circuit" as a more generic expression. The chief advantage of these arrangements is that they eliminate the time-consuming and painstaking hand-wiring operations which otherwise would be required in assembling the electrical equipment, as well as minimizing the human element of error in making the connections.

However, despite this advantage of metalized circuits, they have not been adopted in many instances primarily because of the difficulty encountered in making satisfactory electrical and mechanical connections between the metalized conductors and the terminals which are in circuit with these conductors. Merely clamping a terminal onto an area of the sheet bearing such a conductor, for example, does not insure a reliable electrical connection between the conductive parts. It has been proposed to remedy this to some extent by forming the chassis or insulating base in such fashion that each of the holes which receives a terminal is actually lined with the metal of a conductor before the terminal is inserted in the hole. This tends to afford a better connection, but it is not a complete solution to the problem, for it still has been found necessary to solder or otherwise bond the terminals to the conductors so as to prevent poor connections from developing while the equipment is in service. This partially defeats the principal objective of a metalized circuit, namely, to reduce the labor involved in manufacturing complex electrical equipment. Riveting and like operations have been proposed also, but connections formed in this manner are not dependable.

The mounting of the replaceable electrical components on a chassis or insulating panel is another problem encountered in the manufacture of electrical apparatus utilizing metalized circuits. Some components such as tubes and transformers are provided with male prongs or pins, while others such as resistors and capacitors merely have wires extending therefrom. I have found that to satisfactorily mount both forms of components on the chassis, the terminals preferably should have actual biting contact with the prongs or wires inserted therein. In prior types of metalized circuit arrangements it has not been feasible to provide a positive grip of the terminals on the components, such that the parts could not work loose, without at the same time interfering with the replaceability of the components. Still another problem, and one which is not confined to metalized circuit devices, has been the provision of a simple yet effective mounting for the loudspeaker of a radio receiver. It is desirable that both the loudspeaker and the terminals for the other components of the equipment be so constructed that they are assembled on the chassis merely by being inserted in appropriate openings therein and snapped into position, without any soldering or other individual securing operations.

Accordingly, it is an object of the present invention to provide an improved electrical apparatus of the metalized circuit type which is so constructed that the various permanently-mounted terminals or clips therein are securely and reliably connected to the metalized conductors by simple push-in operations that can be performed simultaneously by a machine.

A further object is to provide sturdy, rigidly mounted snap-in clips on a metalized circuit base or chassis, these clips having excellent electrical connections with the metalized conductors, free of soldered or riveted joints.

A further object is to eliminate most, if not all, of the hand wiring operations in the assembling of complex electrical equipment such as radio sets, and particularly to eliminate soldering, riveting and other bonding operations conventionally employed.

Still further objects are to reduce the cost of manufacture of such equipment, simplify the construction thereof, obtain greater uniformity in "stray" circuit capacities, inductances and resistances, and to provide a novel method of making electrical apparatus which can be performed by relatively unskilled or inexperienced help.

Still another object is to provide an improved loudspeaker mounting of the snap-in type.

A feature of the invention is the use of push-in clips or terminals in conjunction with metalized conductors deposited on an apertured insulating sheet, the arrangement being such that each hole is completely lined with a portion of the metal of a conductor before a clip or terminal is inserted therein, and each clip or terminal positively grips the wall of the hole due to its inherent resiliency, thrusting itself against the metal lining of the hole and cutting or "biting" into the lining to make a solderless electrical connection therewith.

A further feature is the provision of wings or tabs on the clips which snap outwardly to lock the clips to the insulating sheet when they are fully inserted in their respective holes.

Still another feature is the slit construction of the clips adapting them to receive, in one type or the other, pins or wires with a biting grip that insures good electrical connections of the clips to the replaceable electrical components received therein.

A still further feature is the utilization of a vertical side of the chassis to hold a loudspeaker upright, the speaker mounting plate being received in dimpled ears that interlock with this plate and hold it firmly in position.

The foregoing and other objects, features and advantages of this invention will be better understood from a study of the following detailed description taken in connection with the accompanying drawing, wherein.

Figures 1, 2, 3, 4, 5, 6, 7, 8:
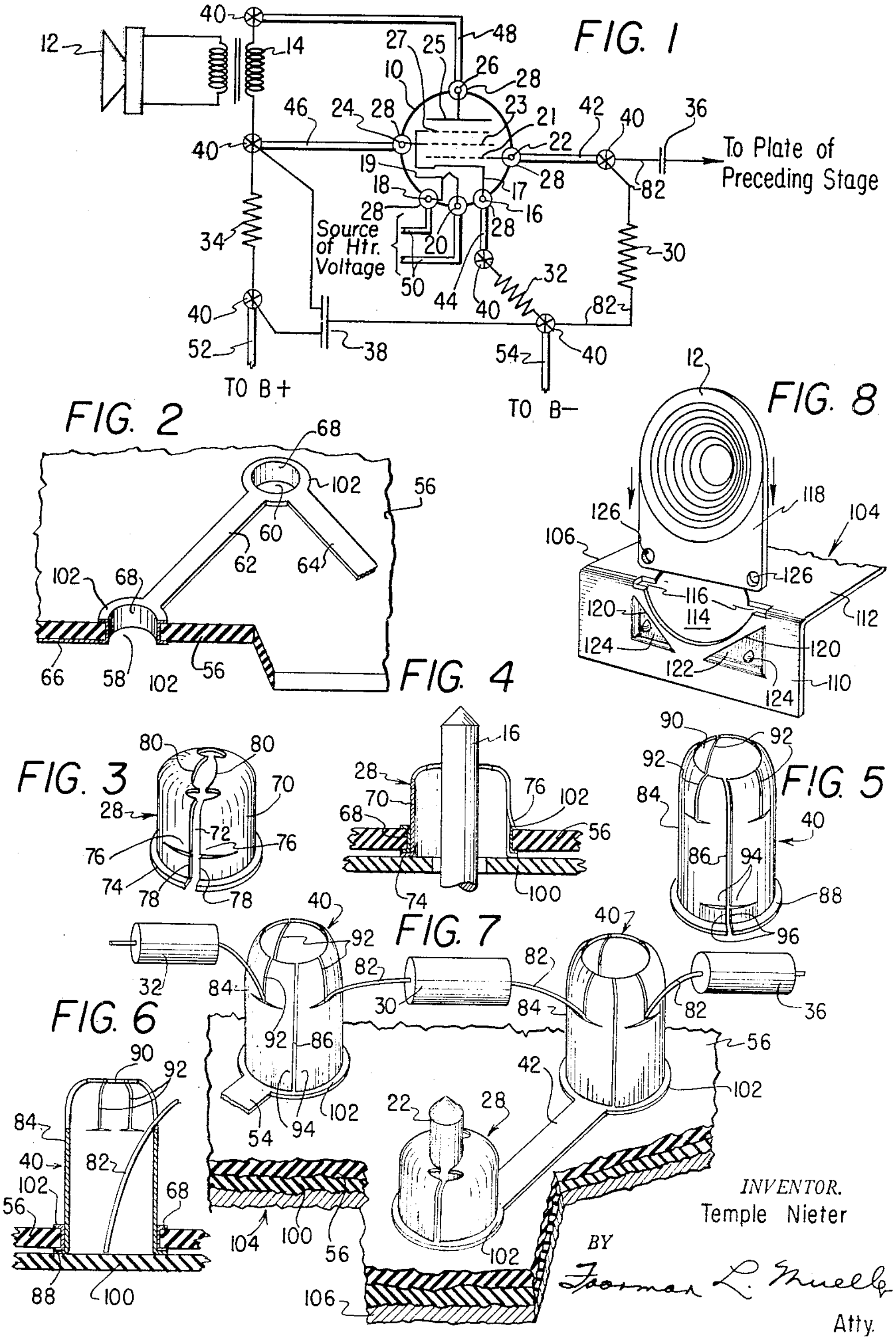
Fig. 1 is a circuit diagram schematically illustrating a typical embodiment of my invention, the same being shown as applied to the audio output stage of a radio receiver.
Fig. 2 is a fragmentary perspective view of a metalized insulating sheet prior to the insertion of clips or terminals therein, showing how the electrical conductors extend into the holes to line the same with metal.
Figs. 3 and 4 are perspective and sectional views, respectively, showing a form of clip designed for insertion into a metal-lined hole in accordance with the invention and adapted to receive a pin or prong of a component such as an electron tube.
Figs. 5 and 6 are perspective and sectional views, respectively, showing a form of clip similar to the foregoing but adapted to receive instead a wire lead of a component such as a resistor or capacitor.
Fig. 7 is a fragmentary perspective view of a chassis on which the audio stage schematically represented in Fig. 1 may be mounted, indicating the manner in which certain components of this stage are mounted on the chassis.
Fig. 8 is a perspective view showing one form of my new loudspeaker mounting.

In practising the invention, a sheet of rigid insulating material having substantial thickness is perforated in a number of places to receive snap-in clips or terminals which are adapted to hold the extending terminal portions of electrical components such as electron tubes, I. F. transformers, resistors and capacitors. Before the clips are mounted in the holes of the insulating sheet, a suitable electrically conductive material such as silver or copper is deposited on the sheet in such a fashion as to form electrical conductors extending between the holes in accordance with a predetermined circuit arrangement. The conductors are also caused to extend into the holes so that each hole is lined with conductive material. Each of the clips has a resilient, slit, hollow shank, and the diameter of this shank is normally greater than the diameter of the hole into which the clip is inserted. When the clip is inserted into a hole, the shank of the clip is subjected to a transverse stress causing the edges of the slit to be thrust against the lining of the hole. These edges dig into or "bite" the metal lining, thereby assuring a good electrical connection of the clip to the conductor. Locking tabs on the shank snap outwardly when the clip is fully inserted in the hole, so that the clip cannot work loose or be removed from the hole.

The clips are of two kinds, one having biting jaws that are adapted to grip a pin or prong of a component such as an electron tube, and the other type having a series of short lengthwise slits adjoining an opening in the protruding end of the shank. In this latter type of clip, which is adapted to receive the wire leads of resistors and capacitors and the like, wires are attached to the clips by being inserted first in the open end and then pulled sideward to enter a pair of the jaws defined by the short slits, the wire being held by the "bite" of the jaws. The deposited metal conductors can be arranged in any desired fashion on the insulating sheet, and they can be formed by any of a number of methods, some of which will be described hereinafter.

Referring now to the drawing, Fig. 1 represents a portion of a typical electrical apparatus in which the invention may be utilized. This comprises, in the present instance, the audio output stage of a radio receiver. As shown, this stage includes an electron tube 10 of the pentode type, a loudspeaker 12, an output transformer 14 and a number of resistors and capacitors. The tube 10 has a number of terminals in the form of pins or prongs which project from the base of the tube. These consist of a cathode pin 16, heater pins 18 and 20, a control grid pin 22, a screen grid pin 24 and a plate pin 26. In accordance with the present invention, each of these pins is adapted to be received in a clip or terminal 28 (shown more specifically in Figs. 3 and 4) mounted on the chassis of the radio receiver, the clips 28 being relatively spaced to correspond with the relative spacing of the pins in the base of the tube 10. These pins are connected internally of the tube 10 to the various tube elements comprising the cathode 17, heater 19, control grid 21, screen grid 23 and plate 25. The suppressor grid 27 is connected to the cathode 17 and does not have an external connection.

Other electrical components, such as the resistors 30, 32 and 34 and the capacitors 36 and 38, are electrically connected to clips or terminals 40 (shown more specifically in Figs. 5 and 6) which are mounted on the chassis. Each of the pin clips 28 is connected by an electrical conductor as 42 to one of the wire clips 40. These clips 40 are referred to herein as "wire clips" because they are adapted to grip the wire leads of components such as resistors and capacitors. The various conductors are designated 42, 44, 46, 48 and 50 in Fig. 1. The conductors 50 have connection with other clips (not shown) which are electrically connected with a source of heater voltage. Still other conductors 52 and 54 lead respectively from two of the clips 40 to other clips (not shown) on which the positive and negative potentials of the plate voltage source are impressed.

The various conductors which are indicated by double lines in Fig. 1 are formed on an insulating sheet such as 56, Fig. 2, by any suitable metalized-circuit technique. The insulating sheet 56 in the present instance is included in the chassis of the radio receiver of which the stage schematically shown in Fig. 1 is a part. Holes as 58 and 60 are formed in the sheets 56 before the conductors such as 62, 64 and 66 are produced on this sheet. The conductors then are deposited upon the sheet 56, extending between the various holes therein according to a predetermined circuit arrangement, such as that shown in Fig. 1. The conductors are extended into the holes so that each hole is lined, as indicated at 68, with a portion of the conductive material from the conductor. The conductors may be disposed on both sides of the sheet 56. For example, the conductors 62 and 66 are on opposite sides of the sheet, and if desired, these conductors may be run to the same hole 58 so as to be electrically interconnected through the lining 68 of this hole. The conductor 66 on the bottom surface of the sheet 56 may be the same general configuration as conductors 62 and 64 on the top surface of the sheet. In Fig. 2, conductor 66 is shown in longitudinal section. There may also be a plurality of conductors extending to the same hole on the same side of the sheet, as in the case of the conductors 62 and 64. Some conductors will extend between only two holes in the sheet 56, while others (as in the case of the plate voltage conductors) may be more extensive.

The clips 28 and 40 are adapted for insertion into the holes as 58 and 60 in the insulating sheet 56. These clips are of the snap-in type which lock themselves in position once they are inserted in the holes. Referring to Figs. 3 and 4 each of the clips 28 has a short tubular shank 70 which is slit along one side thereof as indicated at 72. A split flange 74 at one end of the shank 70 serves to limit insertion of the clip into a hole. The shank 70 is also transversely sheared for a short distance on each side of the slit 72 to form locking tabs 76 which snap outwardly (as shown in Fig. 4) when the clip 28 is inserted in the hole, thereby locking the clip 28 in position. The edges 78 of the slit 72 between the tabs 76 and the flange 74 are adapted to dig into or have biting engagement with the conductive lining 68 of the hole. The diameter of the shank 70 normally is greater than the diameter of the hole as 60 in the sheet 56, so that the shank 70 is placed under transverse stress when the clip 28 is inserted in the hole. This biting engagement of the edges 78 with the conductive lining 68 is sufficient to insure a permanent and excellent electrical connection between the clip 28 and the conductor as 62 without the necessity of soldering or otherwise bonding the clip 28 to this conductor. Transverse biting jaws 80 are formed in the end of the shank 70 to grip the pin 16 of a component such as an electron tube mounted on the chassis, these jaws 80 preferably being continuous with the edges of the axial slit 72.

The clips 40 shown in Figs. 5 and 6 are adapted to receive the wire leads as 82 of resistors and capacitors as 30 and 36, or other components having wire terminals. Each clip 40 has an elongated tubular shank 84 which has a longitudinal slit 86 therein and a flange 88 at one end of the shank 84. Short, inverted, T-shaped slits 92 extend axially from a central opening 90 in the end of the shank 84, for a purpose which will be explained presently. The shank 84 is transversely sheared for a short distance on either side of the slit 86 to form locking tabs 94 and biting edges 96. The tabs 94 hold the clip 40 in place by snap fastener action, and the edges 96 bite into the conductive lining 68 of the hole in the chassis 56 into which the clip 40 is inserted, thereby making an excellent electrical connection therewith.

To connect a component to a clip 40, the wire terminal 82 of the component is first inserted through the opening 90 in the end of the shank 84. Insertion of the wire 82 is limited by a second insulating sheet 100 which adjoins the insulating sheet 56 in the chassis assembly. The wire 82 then is pulled laterally and caused to enter one of the short T-shaped slits 92. The sharp edges of the slit 92 bite into the wire, thereby affording a good solderless connection therewith. The wire 82 is pulled to the base of the slit 92 where it is securely anchored. A clip 40 such as shown can accommodate five wire leads, or can be modified to accommodate a greater number if necessary. All the tag ends of these wires are neatly concealed within the shank 84 of the clip, presenting a workmanlike appearance of the finished chassis. The clips 40 also will accommodate stranded wire leads.

Any of a number of known methods can be utilized to form conductors such as 62, 64 and 66, Fig. 2, on the insulating sheet 56. One method which I have found to be very satisfactory consists of first masking those areas of the sheet 56 which are to remain non-conductive. Lacquer, for example, may be used as the masking substance. The sheet then is immersed in a sensitizing solution containing a sensitizer such as stannous chloride. The insulating sheet 56 should have a sufficiently rough surface so that the sensitizer will readily cling thereto. I prefer to roughen the sheet beforehand to insure this result. The sheet 56 then is removed from the sensitizing bath and is rinsed or washed to remove the excess sensitizer, leaving an almost molecular layer of sensitizer on the sheet. The sensitized sheet then is immersed in a double solution comprising a silver salt (such as silver nitrate) and a reducing agent (such as formaldehyde). The sensitizer acts as a catalyzing agent to cause precipitation of metallic silver from the solution onto the sheet 56. The sheet then is removed from the bath and is treated to remove the lacquer or other masking substance, as well as any silver which may have been deposited upon the masked areas. Such removal may be accomplished by stripping the lacquer, dissolving it in a solvent, or subjecting it to heat, and the excess silver is recovered for subsequent use.

I have also contemplated the use of a greasy substance or an inhibiting agent on those areas of the insulating sheet which are to remain non-conductive, so as to prevent the sensitizer from clinging to those areas or chemically changing the sensitizer so that it cannot act as a catalyst. The plate then is dipped in the aforesaid double salt solution to cause precipitation of silver only on those areas of the sheets where conductors are desired. After the silver depositing operation is finished, the sheet is washed to remove all chemicals save the pure silver from the insulating sheet.

The foregoing processes result in the production of a metalized insulating sheet having thin strips or ribbons of silver clinging to the insulation in the places where conductors are desired and also lining the various holes in the chassis. In order to build the conductors up to a practical thickness for carrying electric currents, the sheet is subjected to an electroplating treatment which causes copper to be deposited onto the silvered areas. Preferably all of the silver-deposited conductors are formed with individual extensions connecting them electrically to silvered areas on the edges of the insulating sheet. After the copper plating operation is finished, the edges of the sheet are sheared off to sever all electrical connections between those conductors which should be insulated from one another.

Another method which may be utilized for producing conductors on the sheet 56 comprises the steps of immersing the sheet 56 in a solution containing a reducing agent, then stamping or printing a solution bearing a metallic salt onto those areas of the sheet which are to bear conductors. Wherever the salt solution contacts the reducer, pure metal such as copper, is deposited on the insulating sheet. While this method does not entail any masking, it may require a certain amount of precision in applying the metallic salt solution to the sheet. The stamp or plate should be so formed that the salt solution is forced into the openings which are to be lined with conductive material.

Preferably, the conductors 62 and 64, Fig. 2, are formed on the sheet 56 so as to provide not only a metallic lining 68 for each hole as 58 or 60, but also an integral flange 102 around each rim of a hole. The flanges 102, together with the lining 68 of the hole, form a sort of eyelet which assists in holding the deposited conductors 62 on the sheet 56. In the case of exceptionally long conductors, where the natural adhesion of the metal to the insulation may not be sufficient, I purposely provide a hole in the path of such a conductor to form an eyelet of this type for strengthening purposes, the hole being otherwise idle since it does not receive a clip.

A portion of a complete chassis assembly is shown in Fig. 7. The chassis 104 includes the conductor-bearing insulating sheet 56, a companion insulating sheet 100, and the metal frame 106 of the chassis. The insulating sheet 100 serves to insulate the metal frame 106 from any conductors such as 66, Fig. 2, which may be on the reverse side of the insulating sheet 56. In assembling the chassis 104 it may be found convenient to employ snap-in clips for holding the various layers of the chassis together. In this event, registering apertures are provided in the various chassis layers, and it is not necessary that these special apertures in the sheet 56 be metalized.

The output transformer 14 is mounted in any suitable fashion on the chassis, for example, by using special snap-in clips to anchor the mounting lugs of the transformer to the chassis. The primary leads of the transformer 14 are received in wire clips 40. The secondary leads may be connected to the speaker through the medium of lugs on the speaker having biting clips instead of holes.

In keeping with one of the primary objectives of this invention, namely, to provide snap-in mountings for the various replaceable components of the electrical equipment, I prefer to mount the loudspeaker 12 on the chassis 104 in the manner indicated in Fig. 8. The metal frame 106 of the chassis 104 has a vertical wall 110 that is adapted to support the speaker 12 in an upright position. At the junction of the vertical wall 110 with a horizontal portion 112 of the frame 106 there is formed an opening 114 having on either side thereof slots 116 into which the flat mounting plate 118 of the speaker 12 may be inserted. After the leading corners of the speaker plate 118 are inserted in the slots 116, the plate 118 is slid along the rear face of the wall 110 for a short distance. The wall 110 has diagonal slits 120 therein, and the areas of the wall 110 below the slits 120 are indented as indicated at 122. The leading corner portions of the plate 118 emerge through the slits 120 and continue their downward movement along the front faces of the indented areas 122. Snap fastening means, consisting of dimples 124 in the indented areas 122 and corresponding apertures 126 in the corner portions of the speaker mounting plate 118, interengage to retain the plate 118 firmly in position. It is evident that the speaker 12 will be held securely on the chassis 104 by the means just described.

From the foregoing it will be appreciated that I have provided a novel method of constructing electrical apparatus utilizing replaceable components and metalized circuits, and that I have improved the construction of such apparatus. No particular skill in wiring or knowledge of circuit design is required in assembling this equipment. The formation of the metallic conductors on the insulating sheet 56 is essentially a coating operation. The clips or terminals as 28 and 40 are assembled on the insulating sheet 56 and electrically connected to the various conductors thereon in a purely mechanical manner. The clips are merely pushed in and snapped into place without regard to orientation thereof, eliminating all soldering, bonding or riveting operations.

The present invention has been developed particularly with a view to assembling the chassis by machine. In accordance with this proposal, clips would be fed from hoppers into the metal-lined holes in the sheet 56 and concurrently snapped into position thereon. By following the teachings of the present invention, it becomes a simple matter to produce complex electrical equipment such as radio sets in large quantities with a negligible percentage of assembly errors. Components such as the resistors 30 and 32 and the capacitor 36, Figs. 1 and 7, are easily mounted by means of the clips 40, which require no soldering. The tag ends of the wire leads 82 are neatly collected and concealed within the clips 40. The wire leads of the components can be inserted at any angle into these clips 40, there being five different slits 92 in each clip. The invention enables electrical apparatus such as radio sets to be assembled in their entirety by snap fastening operations, thus greatly expediting the manufacture of such equipment and reducing the cost thereof.

While there has been illustrated and described a preferred embodiment of the invention, it is possible to make many modifications without departing from the spirit and scope of the invention as set forth in the appended claims.

I claim:

1. An electrical connection device comprising a relatively thick rigid sheet of insulating material having holes therein, with each of said holes having a non-yielding wall, conductors deposited on said sheet and respectively extending between said holes in accordance with a predetermined circuit arrangement, said conductors also extending into said holes so that the wall of each hole is effectively lined with a portion of a conductor, and resilient snap-in clips respectively positioned in said holes for receiving the protruding terminal portions of replaceable electrical components mounted on said sheet, each of said clips including a protuberance thereof cooperating with one side of said sheet, an expansive snap fastener portion adapted to be inserted through a hole in said sheet from said one side thereof and cooperating with the other side of said sheet to hold the clip in position, and an expansive contact portion intermediate said protuberance and said snap fastener portion bearing against the metal lining of said hole to afford an electrical connection between the clip and a conductor on said sheet free of any permanent bond between said clip and said conductor, the wall of each hole being sufficiently rigid to withstand the pressure of said snap fastener portion and said contact portion thereon without any change in the size of the hole when the clip is positioned therein.

2. An electrical connection device comprising a relatively thick rigid sheet of insulating material having holes therein, with each of said holes having a nonyielding wall, conductors deposited on said sheet and respectively extending between said holes in accordance with a predetermined circuit arrangement, said conductors also extending into said holes so that the wall of each hole is effectively lined with a portion of a metal conductor, and resilient push-in terminals respectively positioned in said holes for receiving the protruding terminal portions of electrical components mounted on said sheet, each of said terminals having a snap fastener portion adapted to be inserted through a hole in said sheet from one side thereof and cooperating with the other side of said sheet to hold said terminal in position, and a radially expansive contact portion disposed in said hole and bearing against the metal lining thereof to afford an electrical connection between said terminal and a conductor on said sheet free of any permanent bond between said terminal and said conductor, the wall of each hole having sufficient rigidity to withstand the pressure of said snap fastener portion and said expansive contact portion thereon without any change in the size of the hole when the terminal is positioned therein.

3. In an electronic apparatus having plug-in components such as electron tubes with pins projecting therefrom and other components such as resistors and capacitors with wire leads extending therefrom, a chassis assembly comprising an insulating sheet of relatively thick rigid material having a plurality of holes therein, with each of said holes having a nonyielding wall, resilient contact clips respectively positioned in all of said holes and adapted to receive said pins and leads, with the clips positioned in certain holes having jaws to grip to said pins and the other clips having jaws to grip said wire leads, and conductors deposited on said sheet and extending between said holes in accordance with a predetermined circuit arrangement, said conductors also extending into said holes whereby the wall of each hole is lined with a portion of a conductor, each of said clips including a flange seated on one side of said sheet, an expansive snap fastener portion adapted to be inserted through a hole in said sheet from said one side thereof and cooperating with the other side of said sheet to hold the clip in position, and an expansive contact portion having a longitudinal slit therein disposed intermediate said flange and said snap fastener portion and bearing with radial pressure against the metal lining of said hole to afford an electrical connection between said clip and a conductor on said sheet free of any permanent bond between said clip and said conductor, the wall of each hole having sufficient rigidity to withstand the pressure of said snap fastener portion and said contact portion thereon without any change in the size of the hole when the clip is positioned therein.

4. In electronic apparatus having components with rod-like terminals projecting therefrom, a chassis assembly including in combination, an insulating sheet of relatively rigid material having a plurality of holes therein, resilient contact clips respectively positioned in said holes having jaw portions for receiving the terminals, and conductors deposited on at least one surface of said sheet and extending into said holes and lining the walls thereof, each of said clips including a flange portion engaging one side of said sheet, an expansive snap fastener portion adapted to be inserted through a hole in said sheet from said one side thereof and cooperating with the other side of said sheet to hold the clip in position, and an expansive contact portion disposed in said hole and bearing with resilient pressure against said conductor lining of said hole to afford an electrical connection between said clip and a conductor on said sheet free of any permanent bond between said clip and said conductor, said jaw portions being so positioned on said clip that upon receiving the terminal therebetween said clip expands to enhance the pressure between said contact portion thereof and said conductor lining of said hole, said sheet of material having sufficient rigidity that the walls of said holes withstand the pressure of said snap fastener portion and said contact portion of said clip thereon without substantial change in the size of said holes.

5. In electronic apparatus having components with rod-like terminals projecting therefrom, a chassis assembly including in combination, an insulating sheet of relatively rigid material having a plurality of holes therein, resilient contact clips respectively positioned in said holes having jaw portions for receiving the terminals, and conductors deposited on said sheet extending between said holes in accordance with a predetermined circuit arrangement and also extending into said holes whereby the wall of each hole is lined with a portion of a conductor, each of said clips including an expansive contact portion disposed in said hole and bearing with resilient pressure against said conductor lining of said hole to afford an electrical connection between said clip and a conductor on said sheet free of any permanent bond between said clip and said conductor, a flange portion at one end of said contact portion engaging one side of said sheet, and a resilient tab portion at the other end of said contact portion engaging the other side of said sheet to hold the clip in position, said jaw portions extending from said contact portion and being separated when the terminal is received therein to enhance the pressure between said contact portion and said conductor lining of said hole, said insulating sheet having sufficient rigidity that the walls of said holes withstand the pressure of said snap fastener portion and said contact portion of said clip thereon without substantial change in the size of said holes.

TEMPLE NIETER.

(References on following page)

REFERENCES CITED

The following references are of record in the file of this patent:

UNITED STATES PATENTS

| Number | Name | Date |
|---|---|---|
| 2,037,620 | Dewhurst | Apr. 14, 1936 |
| 2,102,229 | Tinnerman | Dec. 14, 1937 |
| 2,156,003 | Tinnerman | Apr. 25, 1939 |
| 2,215,366 | Alden | Sept. 17, 1940 |
| 2,269,122 | Mitchell | Jan. 6, 1942 |
| 2,336,153 | Ryder | Dec. 7, 1943 |
| 2,433,384 | McLarn | Dec. 30, 1947 |
| 2,458,409 | Paige | Dec. 5, 1949 |

FOREIGN PATENTS

| Number | Country | Date |
|---|---|---|
| 370,061 | Great Britain | Apr. 7, 1932 |
| 732,618 | France | June 20, 1932 |

OTHER REFERENCES

Article entitled, "Stamped Wiring," in "Electronics" magazine of June 1947.